J. KLINE.
HARVESTER CRANK AND PIN.
No. 101,134.  Patented Mar. 22, 1870.
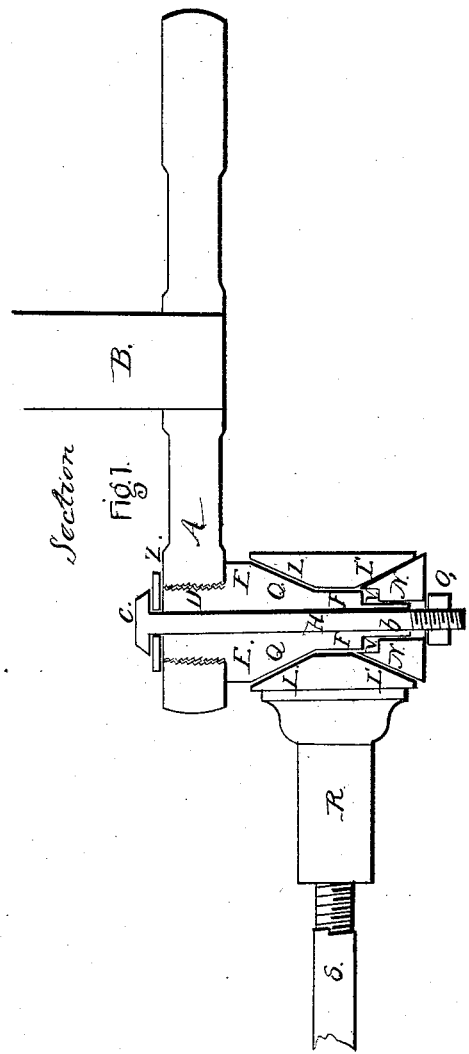
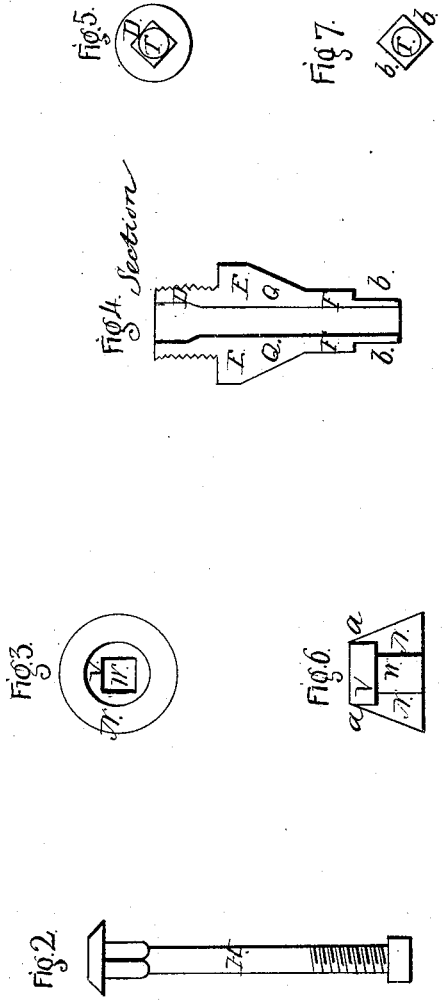
Witnesses:
Theophilus Weaver
David Harris
Inventor:
Jacob Kline

United States Patent Office.

JACOB KLINE, OF MECHANICSBURG, ASSIGNOR TO HIMSELF AND GEORGE WINTERS, OF HARRISBURG, PENNSYLVANIA.

Letters Patent No. 101,134, dated March 22, 1870.

IMPROVEMENT IN HARVESTER-CRANK AND PIN.

The Schedule referred to in these Letters Patent and making part of the same.

I, JACOB KLINE, of Mechanicsburg, county of Cumberland and State of Pennsylvania, have invented certain Improvements in Harvester Crank-Pins or Spindles, of which the following is a specification.

The nature and objects of my invention consist—

First, in so forming all the parts of the device as to be applicable to a crank-arm or fly-wheel, a non-bifurcated connecting-rod or wheel-center, as a spindle or axle.

Second, in so constructing and arranging a conical compensating-follower with an angular central bearing in it, that when in place upon an angular-tipped crank-pin or spindle, it may be set to bear at different points, according to the wear of the hub between it and the crank-pin or spindle base, by crowding a nut on it, which is drawn on a bolt passing centrally through the crank-pin or spindle and the follower, and virtually effects a locking of the nut in this manner.

In the description of the accompanying drawings—

Figure 1 is a plan of my device, mounted on a fly-wheel.

Figure 2 is a view of the central bolt.

Figure 3 is a top view of the conical, angular-recessed follower.

Figure 6 is a side elevation of the same.

Figure 4 is a longitudinal section of crank-pin or spindle.

Figure 5 is a cross-section of its seat.

Figure 7 is a cross-section of its tip or muzzle.

Similar letters denote similar parts in the description.

A is a fly-wheel.

B is its journal.

Z is a washer under bolt-head C, to distribute the bearing of said head.

H is the stem of the bolt, passing centrally through the crank-pin, hub, and follower, and having a nut, O, on its other end.

The crank-pin seat D is a screw-socket joint in the wheel-rim, or, when the crank-pin becomes an axle or wheel-journal, seat D is dispensed with. In said socket, the screw-thread is made to run right or left, according to the direction of motion of the wheel.

E is a cylindrical shoulder or base, to add strength to the screw-joint.

Q is a cone frustum, tapering from base E to shaft F.

F is a cylindrical shaft, which is the journal proper.

Said shaft F has a tip or muzzle, b, fig. 4, which is rectangular outside, as shown in fig. 7.

The conical follower, fig. 6, is a hollow frustum of a cone, whose apex is cut away by a bore, V, down into the frustum to about one-third of the height of the frustum, thus leaving a sharp tapering rim, a a, standing about the bore. Said bore V is of such diameter as to admit the cylindrical shaft or journal F tightly into it. Said frustum, from the bottom of bore V through its remaining length, is perforated with a rectangular cut, which admits tip or muzzle b, fig. 4, tightly.

L L', fig. 1, is a hub, with tapering sockets in its ends, whose pitch corresponds or is parallel to the slant sides Q N of the frusta, respectively. The central bore of the hub is cylindrical, and fits shaft or journal F, thereby making the bearing direct upon it, while the frusta Q N serve as keepers for the hub. This part of the hub-bore and its corresponding part of crank-pin or spindle are so made to effect a direct bearing, that there may be as little tendency as possible to force the frusta Q and N apart, and thus protect the central bolt H, which would be liable to break were the frusta bolted together without the intervening part F. By this mode of construction, the nut O, fig. 1, need only be slightly tightened to maintain the hub center on the journal properly.

The follower N and the hub L L' are of such relative length or depth that, when the hub is on its bearing against frustum Q, the follower will enter into its other socket just far enough to permit the rim a a, at its apex, to slightly enter, like a sleeve, on shaft F, thereby not only insuring an entrance on the shaft when the bur O is driven, but also maintaining the follower in a steady position on the shaft or spindle. When the follower is thus entered and the nut driven properly, there is a remaining space for the shaft F to traverse in the bore V of the follower, as shown in fig. 1.

The object of this arrangement is to adapt the follower to pass in further, to compensate for wear or lost motion, its oblique side, N, for the same reason, being a little longer than the oblique side L' of the hub.

The cavity W, fig. 3, of the follower, and the muzzle of the crank-pin b, fig. 7, are made rectangular, in order that when b is inserted in W, as shown in fig. 1, the follower cannot revolve, except as the crank-pin does, and therefore there is no effort to displace the nut O, and it is thus virtually self-locking. This is a great advantage, as a common carriage-bolt, fig. 2, can be used to hold the follower on the crank-pin, and can be inserted loosely.

The hub L L', fig. 1, has a stem, R, formed on it at right angles to its diameter, which may be employed for attaching an adjustable connecting-rod, S, by a screw-joint. The same result may be attained by having said joint fixed, and having crank-pin, D Q F b, inserted at different radii of wheel A.

In the foregoing specification, this device has been described as a crank-pin mounted on a fly-wheel or crank-arm, and its attachments as a connecting-rod or pitman. It will, however, appear plain, that it may be employed as a wheel-spindle or central support. The wheel-hub will then coincide with what has been here termed hub L L', and the arm R will be the usual connecting-rod on the rim, which, at the same time, may be connected by this improved crank-pin. It is also plain, this device need be only slightly modified to make an axle for conveyance-wheel. In this case the parts E Q F $b$ become the end of the axle, and bolt H is inserted from the other end into it, driving the follower N with its head. In heavy machinery, the crank-pin may be formed in this manner, likewise dispensing with nut O, and driving the bolt into a threaded socket or muzzle, $b$.

The advantages of this improvement over mere conical lugs with a central-bolt through them, are, that the connecting-rod or pitman need not be bifurcated, clamping-bars are dispensed with, and yet a more secure hold or bind of the nut is attained, while at the same time the life of the central bolt is better insured.

Its advantages over cone or conoidal points combined with springs, rocking boxes, &c., are, that the nut need not be drawn tight, leaving the journal free and yet noiseless, and with less friction and liability to break and impair.

Its advantages over crank-pin, sheathed in a plain or many-sided sleeve, are, that it is stronger and compensates for wear.

Its advantages over all devices are, that it is almost universally applicable as crank-pin, journal, or spindle, and more durable and compact.

I desire not to claim cone points, conoidal journals, &c., simply for the above reasons; neither do I claim the use of conical or cylindrical washers, simply as such, with merely a through bolt interposed to connect them in a shackle limb, as such device is not new, and is inadequate for crank-pin or spindle use, which requires that its base or trunk end be rigidly mounted or attached, while its other end must be unsupported; as the aforesaid device must be supported at both ends, it is therefore wholly inadequate for crank-pin or spindle, and is not an equivalent of my improvement; but my invention is a semi-coniodal and cylindrical body, surmounted with a rectangular tip or muzzle, and the compensating-follower, bored and recessed to match and act in conjunction with said body and aforesaid hub, as a superior and improved device; therefore,

I claim—

1. Forming a crank-pin or spindle with conical part Q, cylindrical part or shaft F, and rectangular muzzle $b$, solidly massed into one body, and bored to receive a through bolt, in the manner hereinbefore set forth.

2. The conical compensating-follower when constructed with a perforation outwardly rectangular and inwardly cylindrical, and applied to the crank-pin or spindle without contact with the through bolt, in the manner as and for the purpose herein set forth.

JACOB KLINE.

Witnesses:
THEOPHILUS WEAVER,
DAVID HARRIS.